J. D. JONES.
HARVESTING AND THRESHING MACHINE.
APPLICATION FILED JAN. 24, 1913. RENEWED JAN. 28, 1915.
1,253,601. Patented Jan. 15, 1918.
13 SHEETS—SHEET 1.
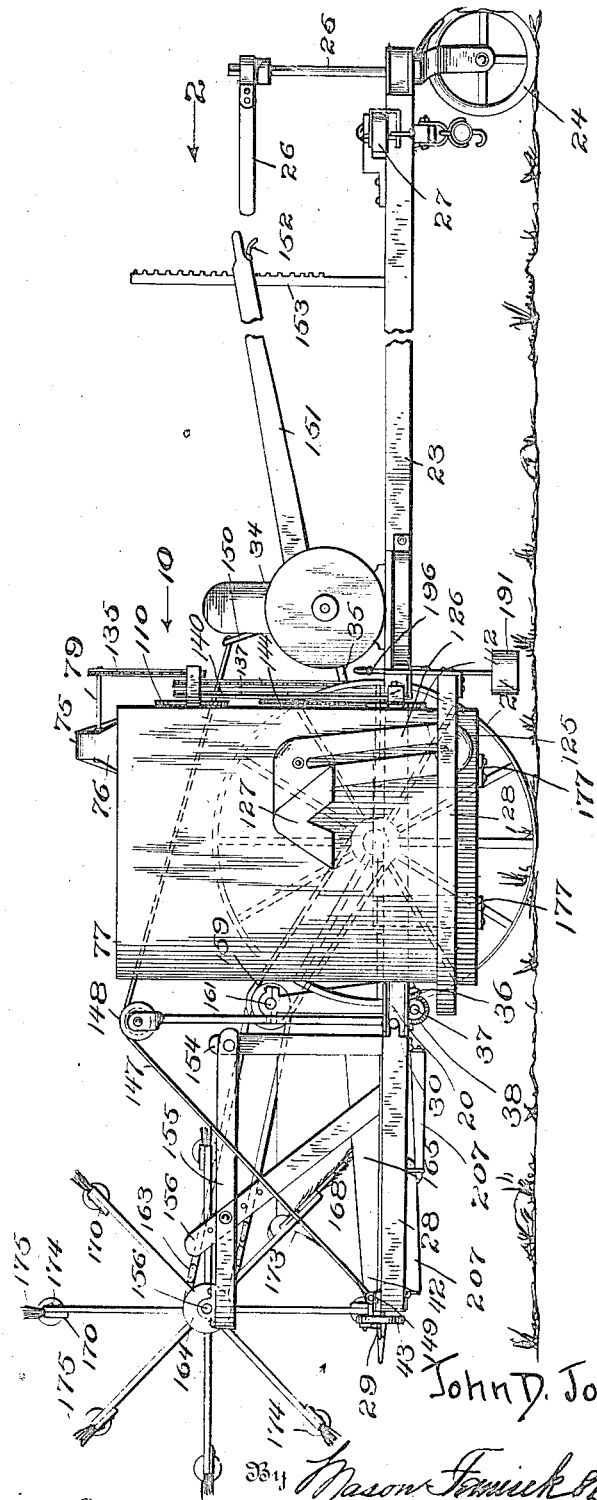
Witnesses
R. S. Trogner
L. L. Morrell
Inventor
John D. Jones.
By Mason Fenwick & Lawrence,
Attorneys

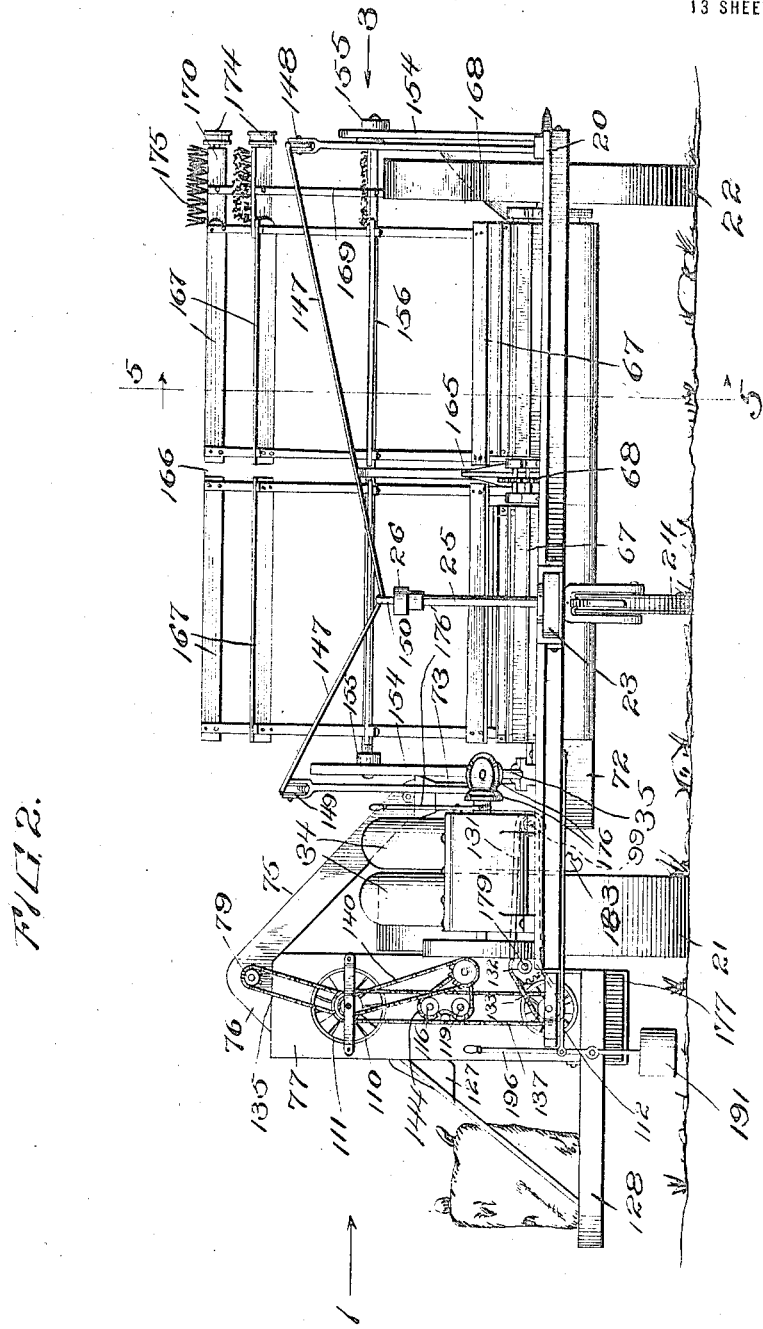

J. D. JONES.
HARVESTING AND THRESHING MACHINE.
APPLICATION FILED JAN. 24, 1913. RENEWED JAN. 28, 1915.
1,253,601.
Patented Jan. 15, 1918.
13 SHEETS—SHEET 3.
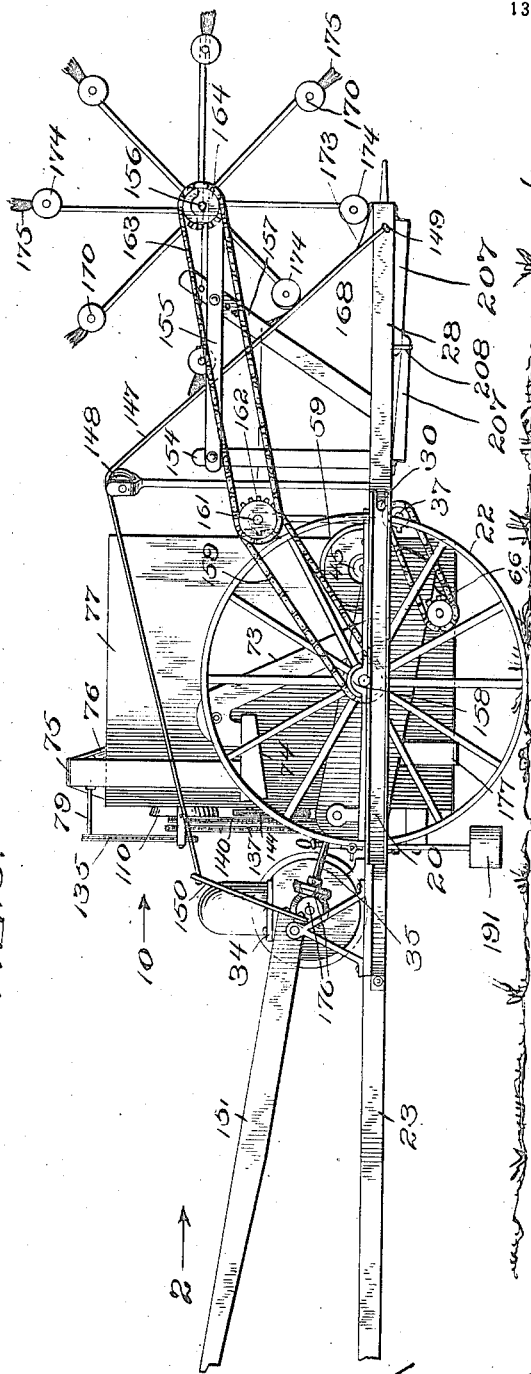
Witnesses
R. S. Trogner
L. D. Morrell
Inventor
John D. Jones.
By Mason Fenwick Lawrence
Attorneys

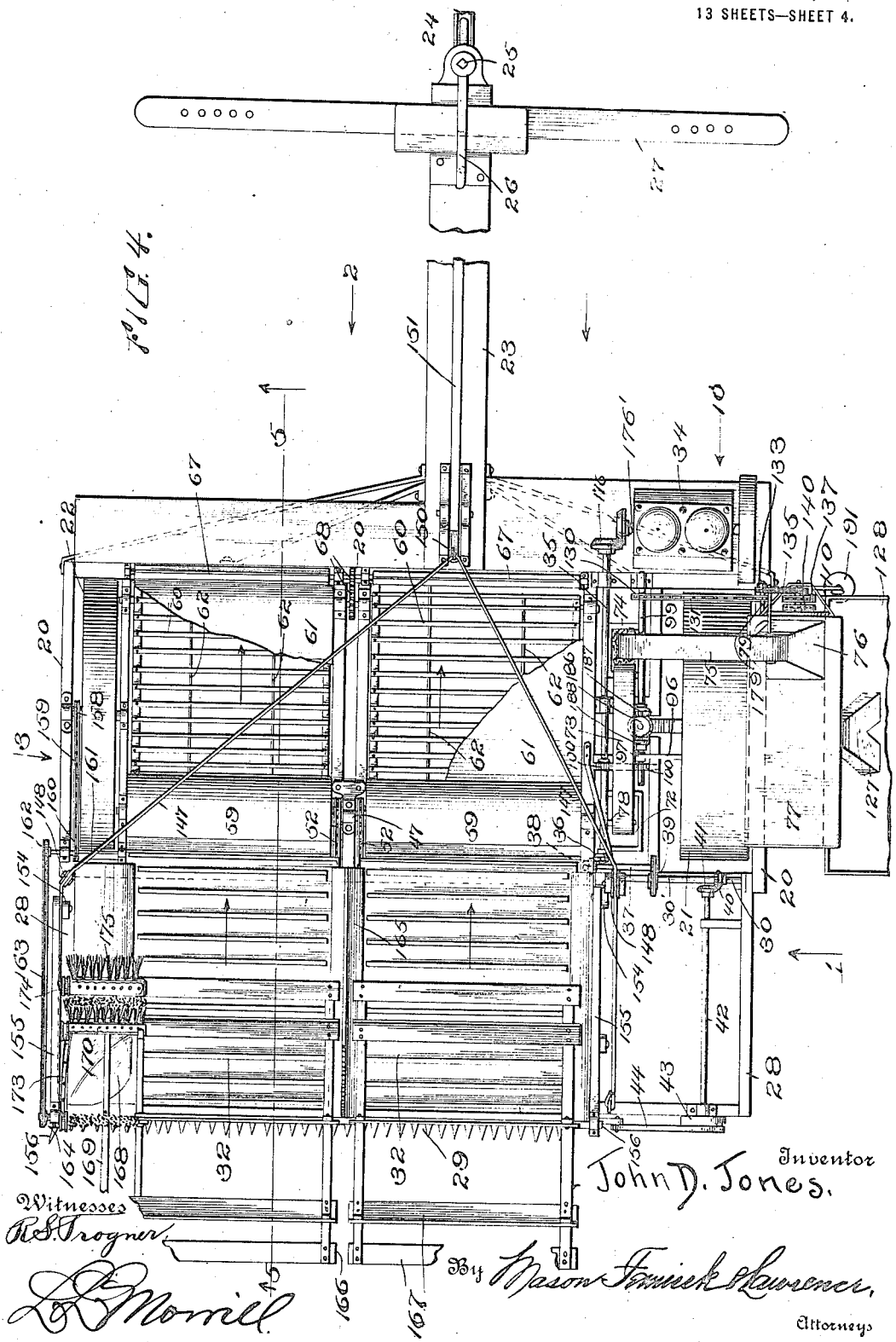

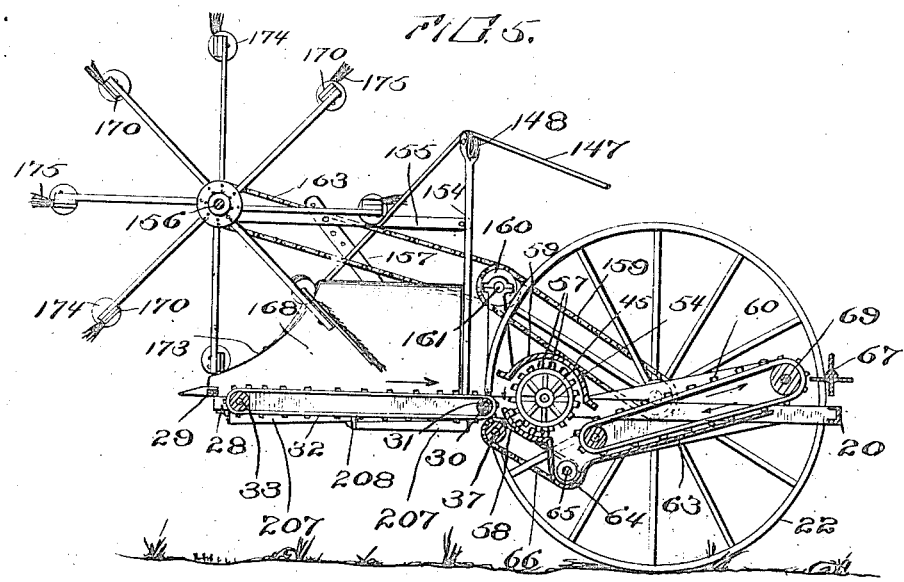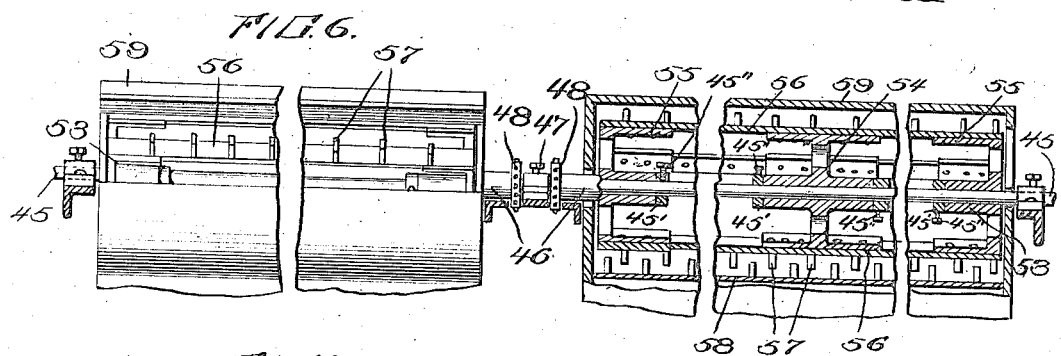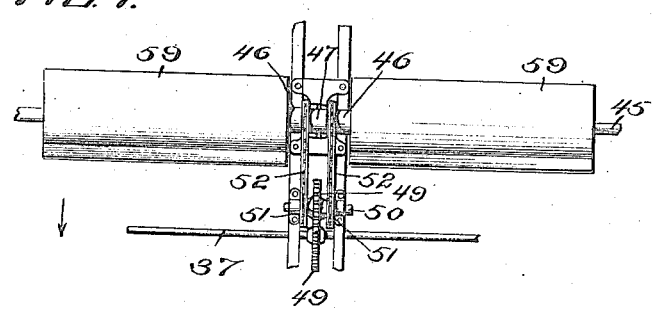

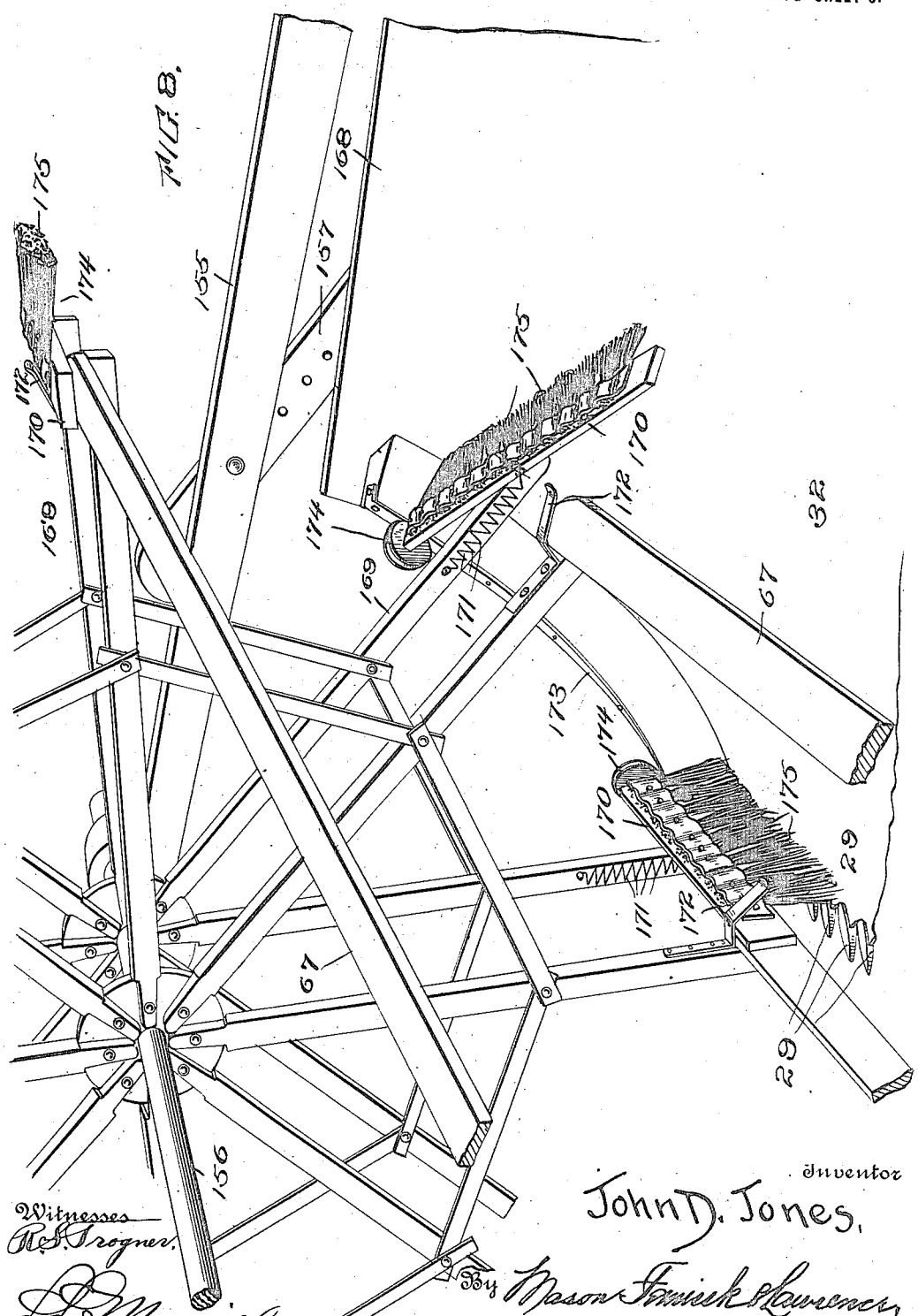

J. D. JONES.
HARVESTING AND THRESHING MACHINE.
APPLICATION FILED JAN. 24, 1913. RENEWED JAN. 28, 1915.
1,253,601.
Patented Jan. 15, 1918.
13 SHEETS—SHEET 7.
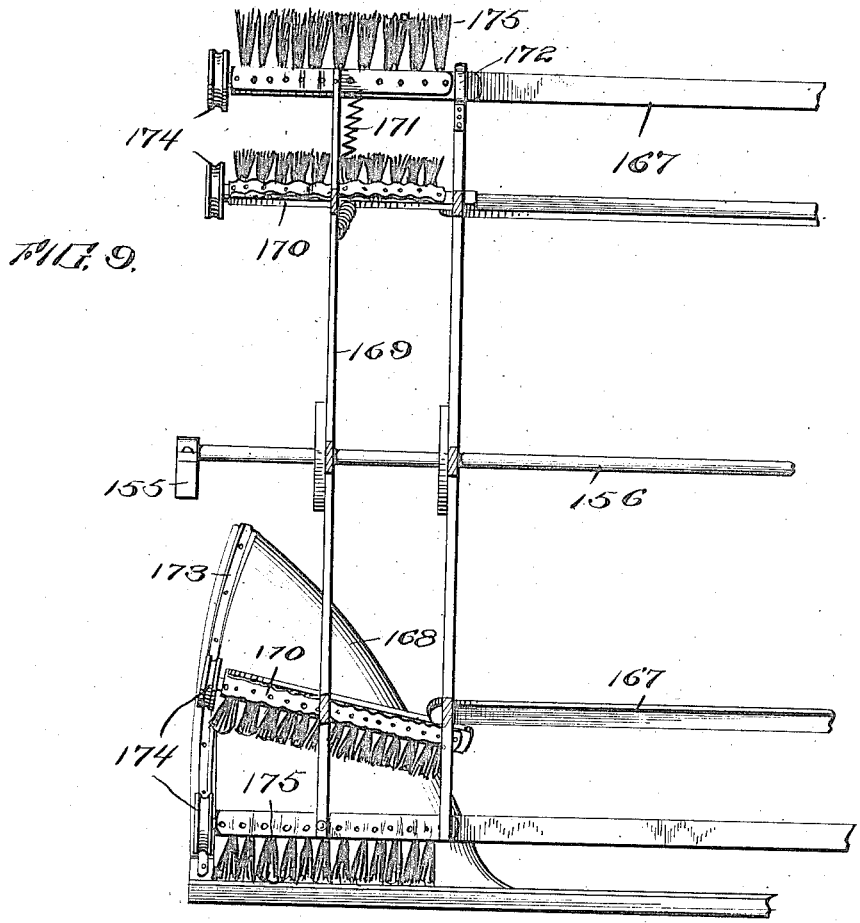
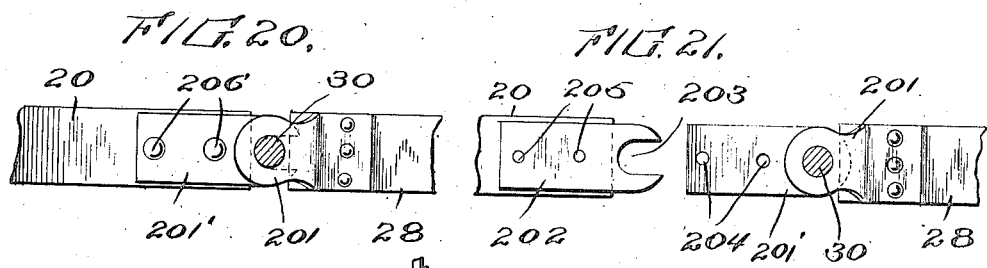

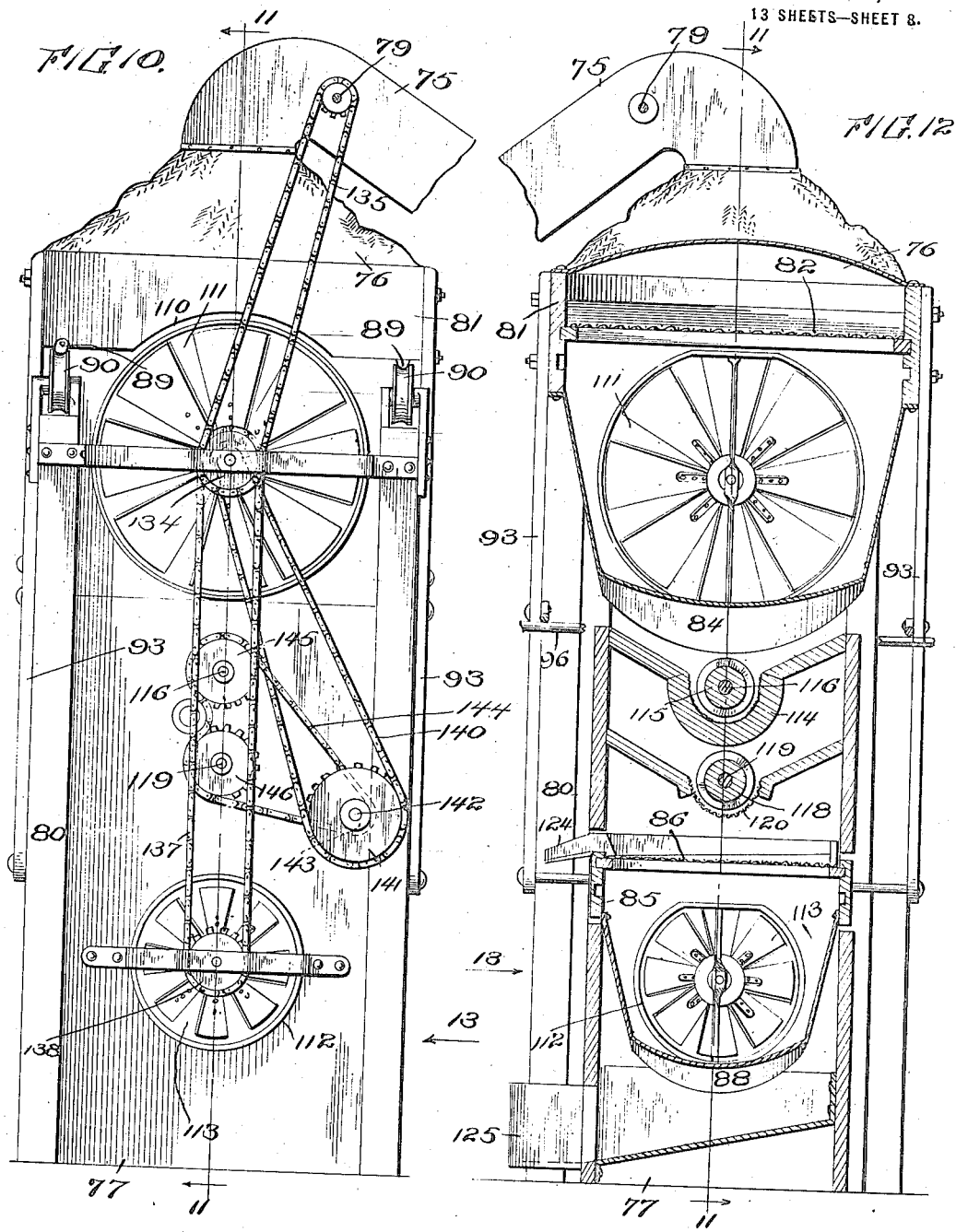

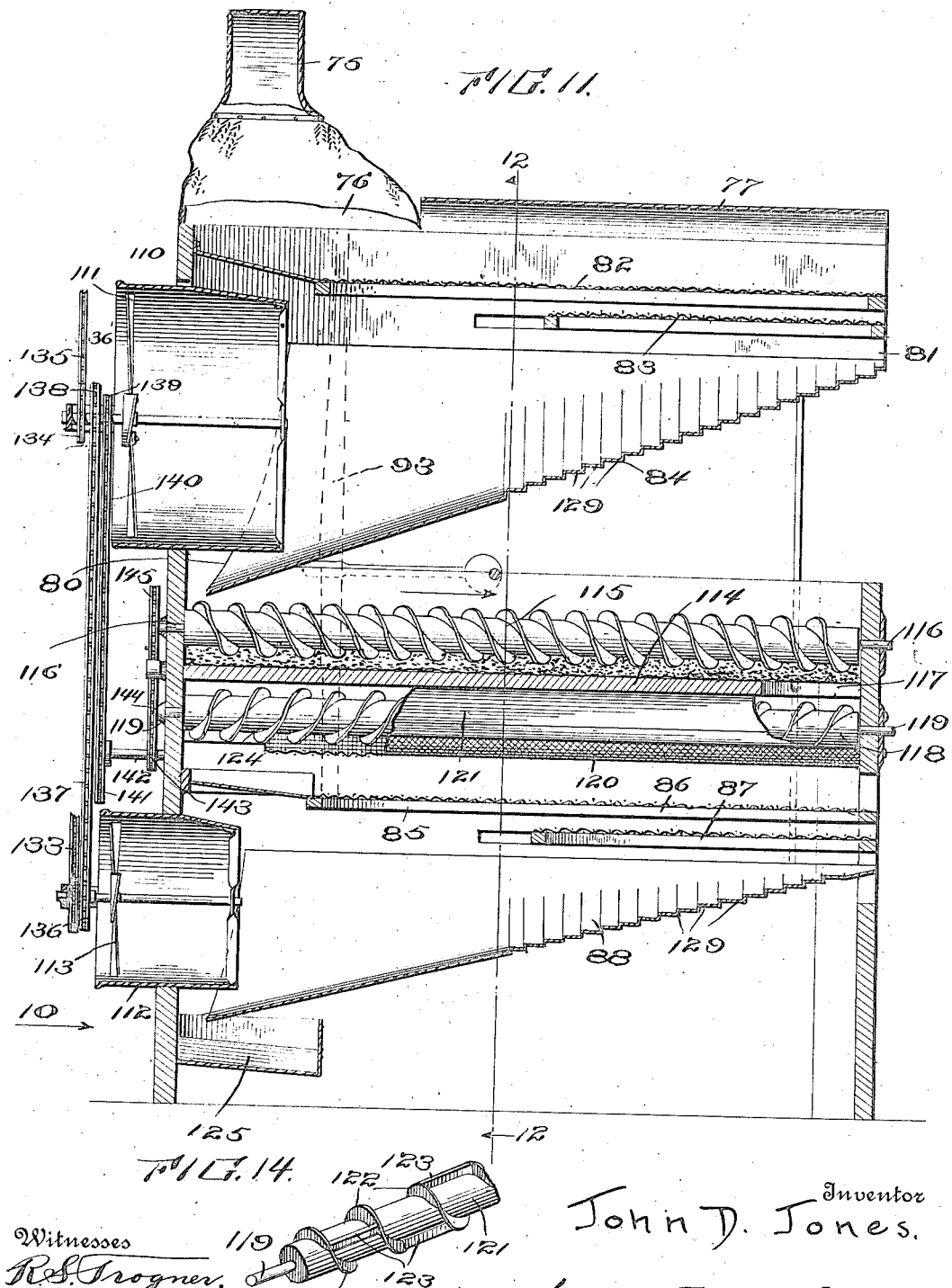

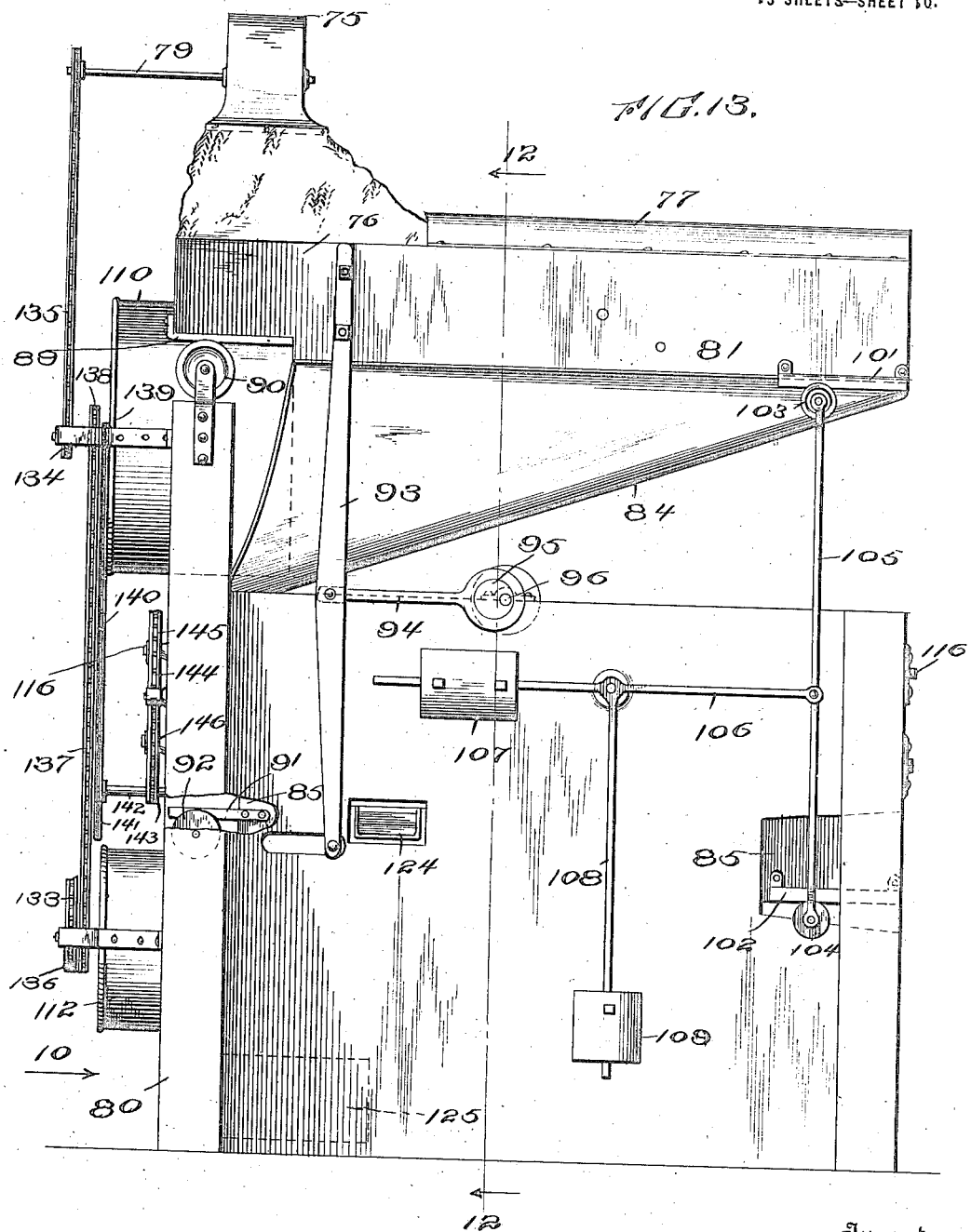

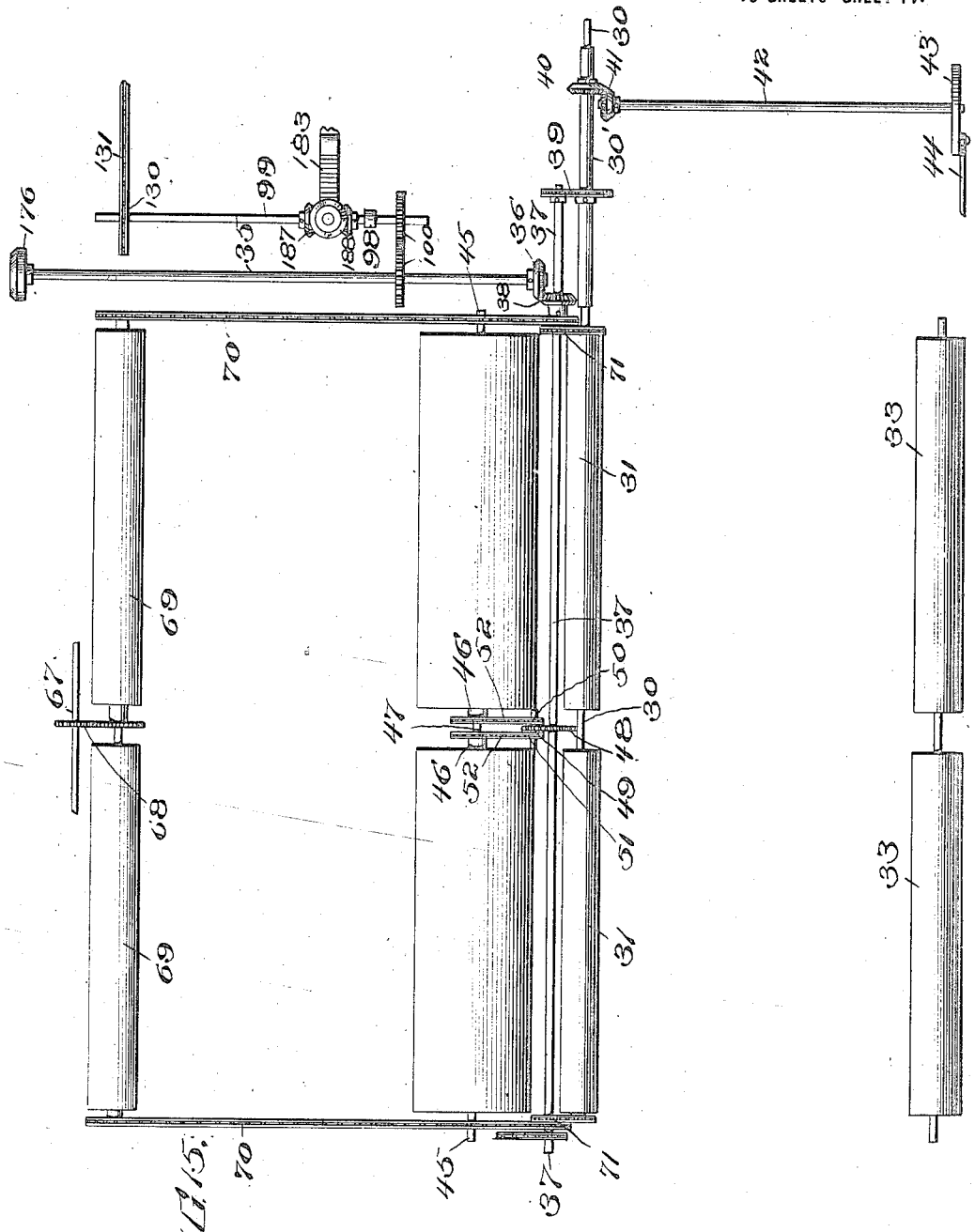

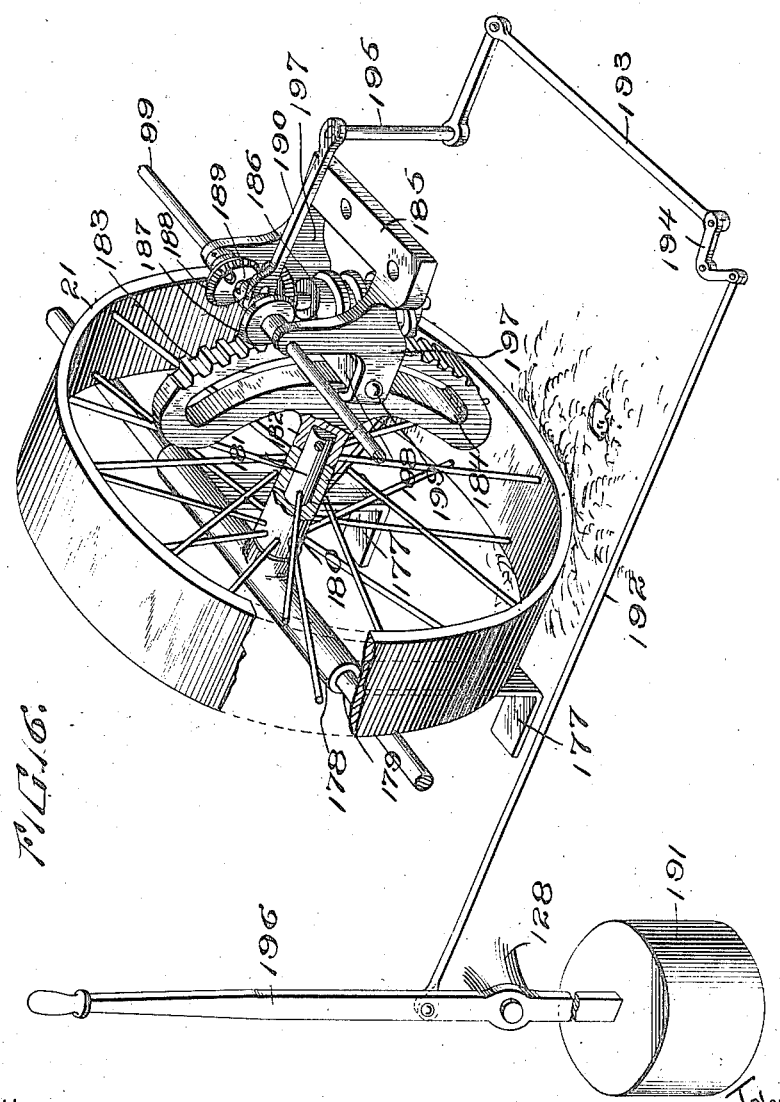

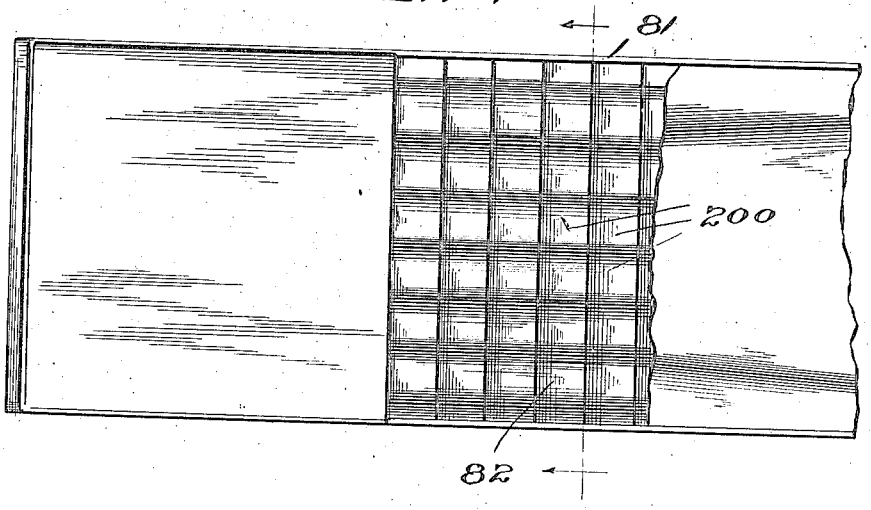
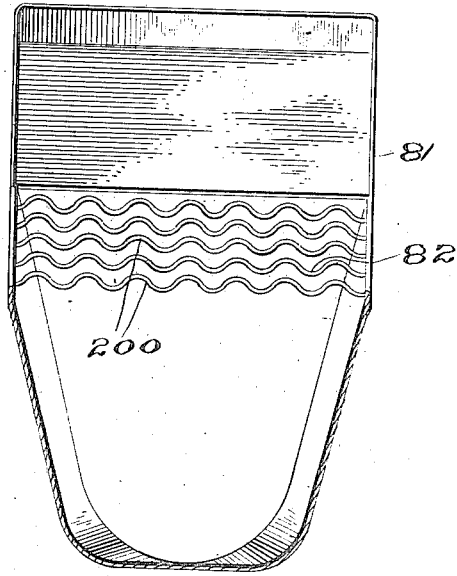
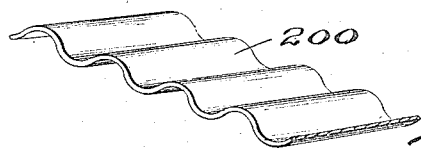

UNITED STATES PATENT OFFICE.

JOHN D. JONES, OF WALLA WALLA, WASHINGTON, ASSIGNOR OF ONE-HALF TO HENRY C. BAKER, OF WALLA WALLA COUNTY, WASHINGTON.

HARVESTING AND THRESHING MACHINE.

1,253,601. Specification of Letters Patent. Patented Jan. 15, 1918.

Application filed January 24, 1913, Serial No. 744,021. Renewed January 28, 1915. Serial No. 4,950.

*To all whom it may concern:*

Be it known that I, JOHN D. JONES, a citizen of the United States, residing at Walla Walla, in the county of Walla Walla and State of Washington, have invented certain new and useful Improvements in Harvesting and Threshing Machines; and I do hereby declare the following to be a full, clear, and exact description of the invention, such as will enable others skilled in the art to which it appertains to make and use the same.

This invention relates to harvesting and threshing machinery and has for an object to provide a structure embodying improved mechanism for harvesting and threshing grain.

A further object of the invention is to provide in combination with a main frame, wheel supported, a cylinder positioned upon the main frame with improved means for introducing grain from the cutter bar to the cylinder and with improved means for separating the grain from the straw after passing through the cylinder.

A further object of the invention is to provide in a harvesting and threshing machine, a cutter bar with threshing mechanism immediately behind such cutter bar and with cleaning and separating mechanism mounted wholly at one side of the cutter bar whereby the driver and the propelling animals in the rear of the cutter bar are provided with substantially an unobstructed view to the front.

A further object of the invention is to provide in combination with a main frame, wheel supported, such main frame carrying threshing and separating mechanism, an auxiliary frame hinged in front of the main frame carrying harvesting mechanism, said auxiliary frame being hinged to the main frame by improved means for transmitting motion from the prime mover to the harvesting machinery.

A further object of the invention is to provide in combination with a wheel supported frame and prime mover, improved means for transmitting power from the prime mover to the several working parts of the harvesting and threshing machinery.

A further object of the invention is to provide in combination with a wheel supported main frame, an improved cleaner structure carried upon said main frame and actuated from the prime mover carried upon said frame by proper transmission devices.

A further object of the invention is to provide in combination with a cutter bar and receiving apron, an improved reel having means for throwing the severed grain upon the apron at a distance removed from the grain line.

A further object of the invention is to provide in combination with a harvesting machine, a threshing cylinder of improved structure and improved means for mounting and driving the said threshing cylinder in combination with said harvesting machinery.

A further object of the invention is to provide in a cleaner for a harvesting and threshing machine improved means for subjecting the commingled threshed grain and chaff to riddling, screening and winnowing devices.

A further object of the invention is to provide in a grain cleaner improved conveyer worms adapted to complete any incomplete threshing of grain submitted thereto.

A further object of the invention is to provide in a grain cleaner an improved shaking screen and shoe with improved means for furnishing air blast to said shoe and screen.

A further object of the invention is to provide in combination with a wheel supported frame, a cleaner carried by the frame embodying a plurality of shaking screens with improved means for maintaining such shaking screens in a true horizontal position irrespective of the tilting of the frame.

With these and other objects in view the invention comprises certain novel constructions, combinations and arrangement of parts as will be hereinafter more fully described and claimed.

In the drawings:

Figure 1 is a view of the harvesting machine in side elevation seen from the delivery side.

Fig. 2 is a view of the harvesting machine seen in rear elevation, such position being shown by arrow 2 in Fig. 1.

Fig. 3 is a view of the machine seen from the grain side as indicated by arrow 3 in Fig. 2.

Fig. 4 is a top plan view of the harvesting machine, arrows 1, 2 and 3 showing the respective points of view of Figs. 1, 2 and 3.

Fig. 5 is a sectional view taken parallel to the line of travel as indicated by line 5—5 of Figs. 2 and 4.

Fig. 6 is a view of the threshing cylinder removed, being partly in elevation and partly in section.

Fig. 7 is a detail view showing the manner of driving the threshing cylinder.

Fig. 8 is a perspective view of a fragment of the reel.

Fig. 9 is a fragmentary view of the reel.

Fig. 10 is a view of the cleaner seen from the rear, as indicated by arrow 10 in Figs. 1, 3 and 4.

Fig. 11 is a vertical longitudinal section through the cleaner indicated by line 11—11 of Fig. 10.

Fig. 12 is a sectional view through the cleaner taken on line 12—12 of Fig. 11 and showing lines 11—11 as the plane of Fig. 11.

Fig. 13 is a view of the cleaner in side elevation as indicated by arrows 13 of Figs. 10 and 12 and showing the line 12—12 as the plane of Fig. 12.

Fig. 14 is a perspective view of a fragment of one of the screw conveyers.

Fig. 15 is a diagrammatic plan view showing the rollers, gearing and transmission mechanism.

Fig. 16 is a perspective view of the cleaner leveling mechanism.

Fig. 17 is a transverse sectional view through one of the shaking screens and shoe.

Fig. 18 is a fragmentary top plan view of one of the shaking screens.

Fig. 19 is a perspective view of one of the screen strips removed.

Fig. 20 is a view of the hinge articulating the main frame with the auxiliary frame.

Fig. 21 is a view of the parts of the hinge shown combined at Fig. 20.

Fig. 22 is a top plan view of one of the platform hinges.

Like characters of reference designate corresponding parts throughout the several views.

The improved harvester and thresher which forms the subject matter of this application comprises a main frame 20 supported upon wheels 21 and 22, the wheel 21 taking the place of the ordinary bull-wheel in harvesting machinery while the wheel 22 takes the place of the ordinary grain wheel. The main frame is further provided with a beam 23 extending to the rear thereof and provided with a caster wheel or rudder 24 pivotally mounted thereon by means of a vertical shaft 25 carrying a tiller 26 and with draft applying means as the evener 27 pivoted upon said beam 23. In operation draft animals are attached to the evener 27 and the driver stands astride the tiller 26 whereby the caster wheel or rudder 24 is manipulated to guide the machine as it advances under the pull of the draft animals.

At the front of the main frame 20 an auxiliary frame 28 is pivoted as shown more particularly at Figs. 1, 3, 4 and 5, such auxiliary frame carrying at its forward side a cutter bar of substantially the usual and ordinary type indicated at 29, shown more especially at Figs. 4 and 5.

The auxiliary frame 28 is hinged to the main frame 20 by means of a shaft 30 which extends entirely through the frame as indicated more particularly at Figs. 4 and 15. The shaft 30 is not rotatable but rigidly mounted and rotating thereon are rollers 31 which carry aprons 32, rollers 33 being also provided adjacent the cutter bar 29 for carrying said aprons.

Mounted also upon the frame 20 is a prime mover 34, here shown as a conventional internal combustion engine connected by means of a shaft 35 and gear 36 with a line shaft 37 which also extends longitudinally of the machine as shown more particularly at Figs. 4 and 15. The shaft 37 is provided with a gear 38 intergeared with the gear 36 whereby such shaft 37 receives motion from the prime mover 34.

The shaft 37 is provided with a chain and sprocket gearing, as shown more particularly at Figs. 4 and 15, whereby connection is made with a sleeve 30′ carrying a gear 40 intergeared with a gear 41 and rotating a shaft 42 to which is secured the pitman 43 which through the medium of the pitman rod 44 drives the cutter bar 29. Mounted also upon the frame 20 is a shaft 45 held against rotation and upon such shaft threshing cylinders are mounted to rotate. The threshing cylinders comprise hubs 46 mounted adjacent the supporting bracket 47 and provided with sprockets 48. The shaft 37 is provided with a gear 49 and a second gear 49′ is mounted upon the stub shaft 50, such shaft being provided with sprockets 51 with sprocket chains 52 passing over such sprockets and the sprockets 48 as shown more particularly at Figs. 7 and 15. The cylinders also comprise opposite cylinder heads having hubs 53 and central hubs and supporting disks 54, as shown more particularly at Fig. 6, all of said heads and supports being provided with arms 55 to which the cylinder bars 56 are rigidly secured by the use of the cylinder teeth 57 in the usual well known manner whereby the cylinder structure, as shown at Fig. 6, becomes unusually rigid, the arms 55 being preferably formed integral with the heads and supports. The several hubs 46, 53 and 54 are held against longitudinal displacement upon the shaft 45 by the collars 45′ abutting against the ends of said hubs, as shown especially at Fig. 6 and provided with set screws 45" by which the said collars are moved into abutting engagement with said hubs and prevent longitudinal movement of the cylinder upon its shaft 45 as the machine is moved over rough and uneven ground which would otherwise tend to throw the teeth 57 out of proper operative relation with the teeth of the concave. In conjunction with the threshing cylinders the usual concaves 58 are provided and are inclosed by a housing 59 shown particularly at Figs. 5, 6 and 7 whereby grain passing from the aprons 32 is received into the cylinder and is discharged after being threshed upon the rattler rake 60. The rattler rake 60 is constructed in substantially the usual manner of end belts and slats but is also provided with intermediate wires 62 which prevent the straw from falling through between the slats of the rattler but offer no obstruction to the passage of the grain therethrough. Beneath the rattler rake 60 an inclined deck 63 is provided terminating at its lower end in a trough 64 in which is rotatably mounted a worm conveyer 65. The worm conveyer 65 is driven by a sprocket chain 66 from the line shaft 37 and a beater 67 is provided at the rear edge of the rattler for forcing the straw downwardly at the rear of the machine. It will be noted that the beater 67 is driven by means of gear 68 from the rollers 69 which in turn receive motion from the line shaft 37 through the medium of sprocket chain 70, as shown more particularly at Fig. 15. The aprons 32 are likewise driven by sprockets and chains shown at 71 in Fig. 15 from the line shaft 37 connecting directly with the rollers 31.

From the conveyer worm 65 the threshed grain is discharged into a shoe 72 from which it is raised by an elevator 73 and discharged into a shoe 74 and again raised by an elevator 75 and discharged into a boot 76 of the cleaner, shown as a whole at 77, the detail of such cleaner being shown particularly at Figs. 10 to 14 inclusive. The conveyer 73 is driven from the worm shaft as indicated at 78 in Fig. 4 and the conveyer 75 is driven by a shaft 79 from the cleaner drive hereinafter described.

The cleaner comprises a framework 80 in the form of a housing as shown particularly at Figs. 10 to 13 inclusive and is provided with a shaking frame 81 having a screen 82 upon which the grain is received from the boot 76. As disclosed particularly at Fig. 11 a second screen 83 is provided underneath the first screen 82 and a shoe 84 also provided rigidly carried by the shaking frame 81 and moving therewith. The shaking frame 81 is located at the top of the housing 80 and a second shaking frame 85 is located at the bottom of the housing carrying likewise screens 86 and 87 and a shoe 88.

The shaking screen 81 is provided with a track member 89 bearing upon a roller 90 whereby longitudinal motion is permitted and the shaking frame 85 is provided with a similar track member 91 bearing upon a roller 92 permitting similar movement of such shaking frame. Shaking of the frames 81 and 85 is accomplished by means of a bar 93 preferably though not necessarily rigidly attached to one of said frames as particularly shown attached to the frame 81 and connecting at its opposite ends with both of said frames as shown at Fig. 13. The bar 93 is driven by means of a pitman 94 from an eccentric 95 carried upon a shaft 96 provided with a pulley 97 which receives motion through the medium of a cross belt from a pulley 98 carried upon a shaft 99. The shaft 99 receives motion through the medium of the gear 100 from the main drive shaft 35 and serves to drive the cleaner. At their ends opposite the rollers 90 and 92 the shaking frames 81 and 85 are respectively provided with track members 101 and 102 bearing upon rollers 103 and 104 respectively, such rollers being carried by a strut bar 105. The bar 105 is pivotally connected with a lever 106 which is provided with a counterweight 107 adapted to equalize the weight of the shaking screens 81 and 85 and with a lateral offset 108 to which is suspended a pendulum weight 109 through the medium of which the screens of the shaking frames 81 and 85 are continuously maintained in horizontal planes.

At the outer end of the shoe 84 a fan casing 110 is provided in which is mounted a propeller fan 111 serving when rotated to produce a blast of air in the shoe 84 under the screens 82 and 83. At the lower shaking frame 85 a similar fan housing 112 is located in which is mounted a similar fan 113 discharging an air blast into the shoe 88 under the screens 86 and 87.

It will be noted especially from Figs. 10, 11 and 12 that the shoes 84 and 88 are curved at the bottom, the curvature naturally increasing in radius toward the adjustable end of the shoe, and that the blast from the propeller fans 111 and 113 will, therefore, be introduced into these curved shoes in a rotating condition. It has been found from exhaustive experiments that the introduction of the blast into such a curved shoe by the use of a propeller fan introducing the blast in a rotating or spiral condition serves to clean the grain to a much better extent while not subjecting the grain to such a straight blast as to blow the grain when cleaned outwardly through the overflow ends of the screens.

The shoe 84 discharges into a trough 114, such trough being preferably composed of an abrading material, carborundum being preferably employed for that purpose, and a worm 115 is mounted to rotate within such trough upon the shaft 116. The worm 115 receiving the grain from the shoe 84, moves such grain in the direction indicated by the arrow in Fig. 11 over the carborundum or abrading surface and thereby serves to completely thresh and shell any kernels of grain which have reached this stage of the process while still carrying some of the chaff therewith. At the end of its movement the grain is dropped through an opening 117 onto a worm 118 carried by a shaft 119 and operating in a trough composed of a screen 120. The construction of the worm 118 is shown more particularly in detail at Fig. 14 comprising a core or large shaft 121 nearly filling the screen trough 120 with a very narrow fin 122 about such core 121 so that but little space is provided between the core and the trough. The fins are further provided with webs 123 spaced at intervals whereby the grain is thrown by the conveyer upwardly and thus agitated to properly distribute the grain so conveyed through such screen 120 upon the screen 86 of the shaking frame 85. At the end of screen 86 is provided a spout 124 shown at Figs. 11, 12 and 13 from which any extraneous matter too large to pass through the screen 120 is finally discharged. A discharge shoe 125 is also provided to receive grain from the shoe 88 from which it is carried by a conveyer 126 to the discharge spouts 127 for bagging, a platform 128, as shown more particularly at Figs. 1 and 2, being provided to carry an operative for handling the bags. It will be noted that the shoes 84 and 88 are provided with corrugations 129 by which the grain upon such shoes is forced downwardly even against the blast of air from the fans 111 and 113.

To drive the various working parts of the cleaner 77 the shaft 99 is provided with a sprocket 130 shown at Fig. 4, having a sprocket chain 131 passing thereover extending to a double sprocket 132 seen at Fig. 2 from which passes a sprocket chain 133 to a double sprocket 136 carried upon the shaft of the fan 113, seen at Fig. 11. Upon the shaft of the fan 111 a sprocket 134 is carried over which extends a sprocket chain 135 to a sprocket carried upon the shaft 79 which actuates the conveyer 75.

Carried also upon the shaft of the fan 113 is a sprocket 136 seen at Figs. 11 and 13 over which passes a sprocket chain 137 passing over a sprocket 138 seen at Fig. 11 mounted upon the shaft of the fan 111 so that said fans 111 and 113 are driven in unison.

To drive the worms 115 and 118 which should be driven slower than the fans 111 and 113 a small sprocket 139 is carried by the shaft of fan 111 over which passes a sprocket chain 140 and also over an idler 141 which idler is carried upon a shaft 142 carrying in its turn a small sprocket 143. The sprocket 143 carries a chain 144 passing in turn about the sprockets 145 and 146 carried upon the shafts 116 and 119 respectively operating the worms 115 and 118. It will thus be seen that all of the moving parts of the cleaner are actuated through the medium of the sprocket chain 131 from the countershaft 99.

The auxiliary frame 28 in addition to being supported upon the main frame 20 by the shaft 30 is further supported by cables 147 which pass over bearing pulleys 148 and are connected with the auxiliary frame 28 at its forward edge adjacent the cutter bar as indicated at 149. The rearward ends of the cables 147 are connected to one arm 150 of a bell-crank lever, the other arm 151 of which extends rearwardly adjacent the tiller 26 and is provided with a manually operated detent 152 engaging a rack bar 153 connected with the beam 23 so that by manipulating the arm 151 of the bell-crank lever the auxiliary frame and its cutter bar and other carried parts are adjusted to adjust the height of the cutter bar. Also erected upon the auxiliary frame 28 are uprights 154 to which are pivoted arms 155 carrying at their forward ends the shaft 156 of the reel. The pivoted arms 155 and the shaft 156 are maintained adjustably in position relative to the cutter bar by means of braces 157, the adjustability being accomplished by utilizing the holes in said brace 157.

The reel shaft 156 receives motion by means of a sprocket 158 carried by the grain wheel 22 over which passes a sprocket chain 159 operating a sprocket 160 upon a shaft 161 which in turn carries a sprocket 162 with a chain 163, the latter chain passing also over a sprocket 164 upon the reel shaft 156. It is necessary or highly desirable to drive the reel from one of the traction wheels so that the speed of rotation of the reel will at all times correspond exactly with the speed of the machine so as to properly hold the grain in engagement with the cutter bar and place the cut grain upon the aprons. As the aprons 32 as well as the rattlers 60 are spaced apart at the center of the machine to accommodate the gearing referred to, a divider 165 is employed as shown particularly at Figs. 1, 2 and 4 and the reel is divided in the middle as at 166 shown at Figs. 2 and 4 particularly.

The reel is constructed for the most part with sets of usual ordinary reel slats of the reel frame, as shown at 167, but in order to permit the machine to cut the grain to the full width of the machine, I provide an auxiliary reel extension comprising auxiliary pivoted reel arms 169, which carry pivoted slat sections 170. The end of the cutting table adjacent the reel extension is provided with a housing 168, to coöperate with the pivoted reel slat sections, which is of sufficient lateral extent to cover the path of the traction wheel in the rear as indicated particularly at Fig. 4. The sides of this housing 168, are inclined toward the apron as indicated in Figs. 2 and 9. The auxiliary slat sections 170 are normally held in alinement with the main slats 167 by springs 171, but as the slat sections pass over the inclined sides of the housing 168, they are swung upon their pivots in the manner indicated in Fig. 9, and after passing the housing they are returned to normal position by the springs 171, a clip 172 being provided to limit the movement thereof.

The forward inclined edge of the housing 168 is provided with a track or cam guide 173 and rollers 174 are carried by the slat sections 170 in position to engage such track guide 173 and ride up the guide as indicated more particularly at Figs. 8 and 9 whereby the slat sections follow substantially the contour of housing 168. As shown in the drawings the slat sections 170 carry brush fibers 175 which assist in properly handling the severed grain. It is to be understood, however, that the brush fiber 175 is not essential to the present invention and that under ordinary conditions the slat sections 170 alone will accomplish the purpose desired.

As shown particularly at Figs. 2, 3 and 4 a clutch 176 is provided between the prime mover 34 and the drive shaft 35; one of the clutch members, as for instance that mounted upon the engine shaft, will be considered as movable, said movement being effected by a lever into and out of engagement with the other clutch member. It is to be understood, of course, that while a clutch of the kind mentioned has been shown any gearing of the usual and ordinary type is within the scope of that part of the present invention.

To maintain the cleaner with its screens in transverse horizontal position the cleaner is mounted in straps 177 rigidly secured to or integral with a sleeve 178 see Fig. 16 carried upon a shaft 179 which said shaft is mounted as a bearing upon the main frame 20 permitting the straps 177 and the sleeve 178 and the cleaner carried thereby to move about said shaft as an axis. The bull wheel 21 is also journaled upon the sleeve 178 by means of a lateral sleeve 180 extending therefrom with a shaft 181 inserted through such lateral sleeve 180 as shown more particularly at Fig. 16. The shaft 181 forms the journal for the bull wheel 21 so that the axle of the bull wheel is rigid in relation and cleaner move angularly upon the shaft 179 as described.

To maintain the cleaner in upright or vertical position a collar 182 is also secured upon the shaft 181 and is provided with a segmental gear 183 which being pinned to the shaft 181 is rigidly connected therewith and with the cleaner. The segment 183 is provided with a slot 184 also of segmental formation and a bracket 185 is rigidly secured to the main frame 20. The bracket 185 serves as a journal for the worm 186 which engages the segment 183 and when turned serves to move the segment about its pivot upon the shaft 179. To turn the worm 186, gears 187 and 188 are carried upon the shaft 99 with a clutch member 189 between such gears, the clutch member being splined to the shaft 99 in the usual well known manner and a lever 190 is provided for moving the clutch member 189 longitudinally of the shaft into engagement with the gears 187 and 188 respectively.

To actuate the lever 190 to throw it respectively into and out of engagement with the gears 187 and 188 a pendulum weight 191 is pivoted upon the platform 128 and is connected by means of links 192 and 193 and a bell-crank lever 194 with the lever 190 which is pivoted upon the shaft 195 so that as the pendulum weight 191 swings under the tilting of the machine the clutch member 189 is thrown into and out of engagement with the gears 187 and 188 to rotate the worm 186 in either required direction to move the bull wheel, cleaner and associated parts angularly upon the shaft 179. A handle member 196 is also provided whereby the operative standing upon the bagging platform 128 may manually cause the platform to tilt or right itself as occasion may make desirable.

The bracket 185 is provided with arms 197 which extend upon opposite sides of the segment 183 and a block 198 is inserted through the slot 184 of the segment and pivoted by means of a bolt 199 so that the segment is held at all times slidably in engagement with the worm 186.

The shaking screens 82 and 86 are mounted as above stated upon frames 81 and 85. The construction of these screens 82 and 86 is similar and at Figs. 17, 18 and 19 such construction is shown, the numbers referring to the screen 82 but it is to be understood that they apply with equal force to the screen 86.

The screen is composed of sheet metal strips 200 in serpentine formation as shown particularly at Figs. 17 and 19 with the forward edge of one strip located above the rearward edge of the strip beneath and with the downwardly curved or concaved portions of each strip located above the similar portions of the strip beneath so that notwithstanding such serpentine formation the strips are equally spaced apart throughout their entire length. The strips extend transversely of the frame 81 as indicated more particularly at Figs. 17 and 18.

The auxiliary frame 28 is hinged or articulated to the main frame 20 by means of the shaft 30 as heretofore mentioned, the specific articulation being such that the hinges may be separated conveniently to permit the removal of the auxiliary frame from the main frame for access to the cylinders or for other purposes. The separability of the hinge is accomplished by means of a strip 201 secured to the auxiliary frame 28 at required intervals and through such strip the shaft 30 extends. A strip 201' is hinged upon the rod 30 in contact with the strip 201 and a strip 202 is secured to the main frame 20 at each interval corresponding to the strips 201 and is provided with a slot 203 proportioned to receive the shaft 30 when the auxiliary frame is moved into engagement. The strip 201' is provided with holes 204 proportioned to register with similar holes 205 in the strip 202 when the members are moved together, as shown at Fig. 20 and through such registering holes bolts 206 are inserted. The removal of the bolts 206 permits the separation of the hinge members without disturbing the various rollers, sleeves, bearings and other members located and rotating upon the shaft 30 as before described, the complete separation being permitted by the disconnection or removal of the sprocket chains 39 and 71.

As the auxiliary frame is supported from the main frame by means of such hinge joints and the cable 47 when the hinge is separated it becomes desirable to provide means for supporting the auxiliary frame 28 in substantially the right height for again coupling with the main frame. For this purpose legs 207 are hinged to the under side of the auxiliary frame at such intervals as may be found necessary or desirable and are held ordinarily in inoperative position by a keeper 208. It is obvious that when the legs 207 are swung down to operative position they will engage the ground and the auxiliary frame may be disconnected from the main frame and still supported upon the legs 207 in proper position for again coupling with the main frame 20 when the trouble has been removed and it is desirable to couple the frames together.

In operation, as will be apparent from the foregoing description, the machine is pushed rather than pulled by the draft animals attached at the evener 27 but no part of the mechanical structure is driven by the propulsion of the machine except the reel. The other structure is all driven from the prime mover 34 through the medium of the main drive shaft 35 and in the manner described for the various parts of the machine, such operation being described in conjunction with the description of the parts themselves. It will be apparent that the grain deposited upon the aprons 32 by the reel will be conducted directly into the threshing cylinder, from which cylinder the threshed grain and straw will be deposited by the momentum imparted thereto by the cylinder upon the rattler 60. The threshed grain, chaff and small particles will fall through the rattler onto the deck 63 and into and upon the conveyer 65 which transfers such threshed grain to the conveyers 73 and 75 by which it is elevated into the cleaner 77. The action of the grain in the cleaner has been thoroughly and completely described in connection with the description of the cleaner itself and when the cleaning is completed the cleaned grain is discharged into position to be operated upon by the bagging conveyer 126 by which it is discharged through the bagging spouts 127 and bag as shown at Fig. 2.

Special stress is laid upon the construction and operation of the threshing cylinders operating as they do upon a fixed shaft with collars to prevent the end thrust of such cylinders. It is obvious that in constructing the cylinder and journaling it as shown, the entire bearing in the hub of the cylinders is subject equally to wear and that if any part of the shaft 45 is subjected to greater wear than any other part the shaft may be turned to compensate for such wear so that the cylinder becomes by reason of its mounting capable of a longer operative life than as though mounted upon a shaft which shaft was journaled to rotate. Also by fixing the shaft rigidly and mounting the cylinders upon the same as shown all end motion is avoided and the teeth of the cylinder are properly spaced relative to the teeth of the concave thereby preventing the crushing and grinding of the grain as it passes through.

Special stress is also laid upon the hinging of the auxiliary frame 28 to the main frame, it being hinged upon a shaft forming the bearing for the rollers carrying the aprons as well as carrying the drive for the cutter bar. By this means the same wear resistance is accomplished as just described in relation to the mounting of the cylinder and in addition thereto the aprons 32 always remain at the desired tension irrespective of the tilting of the auxiliary frame and the cutter bar mechanism receiving motion from a gear at the center of tilting of the platform also at all times remains in proper tension.

Special stress is also laid upon the cleaner and especially on those features of the cleaner comprising the blast structure and the leveling of the shaking frames. The use of the screw conveyer with the abrading trough and of the lower conveyer with the agitating webs and distributing screen is also particularly emphasized.

Another point particularly emphasized in regard to the structure is the fact that the draft horses with the exception of one horse at most have a practically clear view ahead. It has been found by experience that with an obstructed view ahead, draft horses many times refuse to travel, but with a practically unobstructed view in front of the horses, much more willingness is found on the part of the horses to perform their labor.

Special stress is also laid upon the construction of the reel with the hinged section whereby the grain wheel travels wholly in the clear and does not trample down the standing grain.

Particular attention is also invited to the drive of the various parts and especially to the line-shaft 37 from which all of the aprons, rattlers, cylinders and cutter bars are operated, such shaft being mounted directly upon the main frame and transmitting motion to the front aprons 32 through the medium of rollers journaled concentrically with the tilting of the frame.

I claim:—

1. In a harvesting and threshing machine, a table supported by a grain wheel, a cutter bar at the front end of the table, a housing at the grain end of the table extending across the path of travel and having its front end forward of the grain wheel and having an inclined forward end, a reel rotating above the cutter bar, auxiliary slat sections formed at the grain end of the reel, means to hold the slat sections normally yieldingly in alinement with the main reel slats, and a cam carried by the housing in position to throw the auxiliary slat sections out of alinement with the main reel slats and cause said sections to follow the inclination of the housing.

2. In a harvesting and threshing machine, a table supported by a grain wheel, a cutter bar carried at the forward end of the table, a housing extending over a portion of the grain end of the table and spanning the path of travel and having its front end forward of the grain wheel, said housing having its forward end inclined both longitudinally and laterally relative to the line of travel, a reel mounted over the cutter bar, auxiliary reel sections mounted at the grain end of the main reel, means to hold the auxiliary reel sections normally yieldingly in alinement with the main reel slats, and a cam carried at the front end of the housing in position to engage the extremities of the auxiliary reel sections and to throw such reel sections out of alinement causing such reel sections to follow the contour of the housing.

3. In a harvesting and threshing machine, a table supported by a grain wheel, a cutter bar at the front end of the table, a housing at the grain end of the table extending across the path of travel and having its front end forward of the grain wheel and having an inclined forward end, a reel rotating above the cutter bar, auxiliary slat sections formed at the grain end of the reel, and means for causing said slat sections to follow the inclination of the housing.

In testimony whereof I affix my signature in presence of two witnesses.

JOHN D. JONES.

Witnesses:
GEORGE H. MACDONALD,
L. L. MORRILL.